(12) United States Patent
Konishi et al.

(10) Patent No.: US 10,897,783 B2
(45) Date of Patent: Jan. 19, 2021

(54) USER APPARATUS AND INDICATION METHOD FOR VOLTE COMMUNICATION

(71) Applicant: NTT DOCOMO, INC., Tokyo (JP)

(72) Inventors: Yasuharu Konishi, Tokyo (JP); Wuri Andarmawanti Hapsari, Tokyo (JP); Shinya Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/771,167

(22) PCT Filed: Sep. 29, 2016

(86) PCT No.: PCT/JP2016/078846
§ 371 (c)(1),
(2) Date: Apr. 26, 2018

(87) PCT Pub. No.: WO2017/077793
PCT Pub. Date: May 11, 2017

(65) Prior Publication Data
US 2018/0310346 A1    Oct. 25, 2018

(30) Foreign Application Priority Data

Nov. 6, 2015 (JP) ................................ 2015-218980
Nov. 20, 2015 (JP) ................................ 2015-227829

(51) Int. Cl.
| | |
|---|---|
| *H04W 76/10* | (2018.01) |
| *H04W 48/10* | (2009.01) |
| *H04W 80/10* | (2009.01) |
| *H04W 48/02* | (2009.01) |
| *H04W 48/06* | (2009.01) |
| *H04W 84/04* | (2009.01) |

(52) U.S. Cl.
CPC .......... *H04W 76/10* (2018.02); *H04W 48/02* (2013.01); *H04W 48/10* (2013.01); *H04W 80/10* (2013.01); *H04W 48/06* (2013.01); *H04W 84/042* (2013.01)

(58) Field of Classification Search
CPC ..... H04W 76/10; H04W 76/27; H04W 48/02; H04W 48/06; H04W 48/08; H04W 48/10;
(Continued)

(56) References Cited

U.S. PATENT DOCUMENTS

2015/0304937 A1*  10/2015  Kim .................... H04L 65/1069
                                                                        370/230
2016/0174188 A1    6/2016  Kim et al.
(Continued)

FOREIGN PATENT DOCUMENTS

WO        2015/016546 A1    2/2015

OTHER PUBLICATIONS

International Search Report issued in PCT/JP2016/078846 dated Dec. 20, 2016 (7 pages).
(Continued)

*Primary Examiner* — Peter Chen
(74) *Attorney, Agent, or Firm* — Osha Bergman Watanabe & Burton LLP

(57) ABSTRACT

A user apparatus according to an embodiment is provided. The user apparatus communicates with a base station, and includes a determination unit configured to, in the case of making a VoLTE call, determine whether a predetermined indicator is included in broadcast information received from the base station; and a transmission unit configured to transmit to the base station an RRC connection request message in which information is included indicating a request for an RRC connection to be established for making a VoLTE call.

4 Claims, 8 Drawing Sheets

(58) Field of Classification Search
CPC ..... H04W 80/10; H04W 88/02; H04W 88/08; H04L 65/1016; H04L 65/1006; H04L 65/1069; H04L 65/1073; H04L 67/14
See application file for complete search history.

(56) References Cited

U.S. PATENT DOCUMENTS

| | | | |
|---|---|---|---|
| 2016/0278096 A1* | 9/2016 | Watfa | H04W 28/0205 |
| 2017/0013644 A1* | 1/2017 | Zhu | H04W 48/12 |
| 2017/0064693 A1* | 3/2017 | Kim | H04W 48/12 |
| 2019/0082350 A1* | 3/2019 | Kim | H04W 28/12 |

OTHER PUBLICATIONS

Written Opinion of the International Searching Authority issued in PCT/JP2016/078846 dated Dec. 20, 2016 (6 pages).

3GPP TS 24.301 V13.3.0; "3rd Generation Partnership Project; Technical Specification Group Core Network and Terminals; Non-Access-Stratum (NAS) protocol for Evolved Packet System (EPS); Stage 3 (Release 13)"; Sep. 2015 (394 pages).

3GPP TS 36.331 V12.7.0; "3rd Generation Partnership Project; Technical Specification Group Radio Access Network; Evolved Universal Terrestrial Radio Access (E-UTRA); Radio Resource Control (RRC); Protocol specification (Release 12)"; Sep. 2015 (452 pages).

Nokia Networks (Rapporteur); "Report of email discussion [91#20][LTE/VoLTE] Establishment cause for mobile-originating VoLTE calls"; 3GPP TSG-RAN WG2 Meeting #91bis, R2-154894; Malmo, Sweden; Oct. 5-9, 2015 (15 pages).

NTT DOCOMO, Inc.; "Backward compatibility issues with MTC"; 3GPP TSG-RAN #51, Tdoc-RP-110206; Kansas City, USA; Mar. 15-18, 2011 (4 pages).

NTT DOCOMO, Inc.; "Way Forward on VoLTE Establishment Cause"; 3GPP TSG-RAN2#92, R2-156414; Anaheim, USA; Nov. 16-20, 2015 (5 pages).

* cited by examiner

USER APPARATUS AND INDICATION METHOD FOR VOLTE COMMUNICATION

CROSS-REFERENCE TO RELATED APPLICATIONS

This application is a national stage application of PCT/JP2016/078846 filed Sep. 29, 2016, which claims priority to Japanese Application No. 2015-218980 filed on Nov. 6, 2015, and Japanese Application No. 2015-227829 filed on Nov. 20, 2015. The contents of the above applications are hereby incorporated by reference in their entirety.

BACKGROUND OF THE INVENTION

1. Field of the Invention

The present invention relates to a user apparatus and an indication method.

2. Description of the Related Art

Standard specifications of communication methods and communication interfaces in a wireless communication system using LTE (Long Term Evolution) have been defined (specified) by the 3rd Generation Partnership Project (3GPP).

In wireless communication systems that comply with 3GPP standards, various regulation control methods have been introduced in order to reduce load of a network due to simultaneous accesses from many user apparatuses. The regulation control methods are roughly categorized into two methods.

In the first regulation control method, regulation information is transmitted in advance from a base station to a user apparatus by using broadcast information, etc., and it is the user apparatus that reduces signal transmission to the base station.

In the second regulation control method, the base station identifies a type of an RRC connection request received from the user apparatus, and transmits a message indicating rejection of accepting the RRC connection request (RRC connection reject) to the user apparatus according to network load.

Which of the regulation control methods is used depends on an operator's operation. There is a case in which only the second regulation control method is applied according to an operator.

CITATION LIST

Non-Patent Literature

[NPL 1] 3GPP TS36.331 V12.7.0 (2015-09)
[NPL 2] 3GPP TS24.301 V13.3.0 (2015-09)

SUMMARY OF THE INVENTION

Technical Problem

In an event venue where many people gather such as a concert, considering the user's convenience, it is assumed that an operation is applied in which, without regulating all communications uniformly, packet communications are regulated while only voice communications are allowed.

In order to realize this kind of regulation control, there is, for example, DSAC (Domain Specific Access Control) as the first regulation control method. DSAC is a regulation control method for a 3G network, and is a technique in which it is possible to regulate voice communications and packet communications separately by performing independent access regulations for CS domain and PS domain, respectively.

Further, as a regulation control method for an LTE network, for example, SCM (Smart Congestion Mitigation) is defined. SCM is a technique for realizing a priority control of a VoLTE call. The priority control of a VoLTE call is realized by not applying ACB (Access Class Barring) to a VoLTE call (by excluding a VoLTE call) when an ACB based regulation control is performed. It should be noted that ACB is a regulation control method in which whether communications are regulated or not is controlled for each of access classes assigned to the user apparatuses.

In the second regulation control method, the base station identifies the type of the connection request message by using "Establishment cause" that is set in the RRC connection request. In the current LTE specifications, there are six causes defined as the Establishment cause (NPL 2).

In the current Establishment causes, there is no cause defined as indicating a VoLTE call. As a result, it is not possible for the second regulation control method to provide an operation in which a voice (VoLTE) call is allowed while only a packet call is regulated.

Therefore, currently, it has been discussed to newly add a cause indicating a VoLTE call to the Establishment causes in order to make it possible for the base station to determine whether a call is a VoLTE call.

In the case where a cause indicating a VoLTE call is newly added, considering the backward compatibility, the user apparatus needs to set an appropriate Establishment cause in an RRC connection request. For example, the user apparatus needs to determine in advance whether the base station is adapted to (corresponds to) a cause indicating a VoLTE call, and, in the case where the base station is not adapted to a cause indicating a VoLTE call, the user apparatus needs to set any one of the causes defined in the current LTE in the RRC connection request.

The present invention has been made in view of the above. It is an object of the present invention to provide a technique in which it is possible to set an appropriate Establishment cause when making a VoLTE call.

Solution to Problem

A user apparatus according to an embodiment is provided. The user apparatus communicates with a base station, and includes a determination unit configured to, in the case of making a VoLTE call, determine whether a predetermined indicator is included in broadcast information received from the base station; and a transmission unit configured to transmit to the base station an RRC connection request message in which information indicating a request requesting an RRC connection to be established for making a VoLTE call is included.

Advantageous Effects of Invention

According to an embodiment, a technique is provided in which it is possible to set an appropriate Establishment cause when making a VoLTE call.

DETAILED DESCRIPTION OF THE PREFERRED EMBODIMENTS

Figure 1:
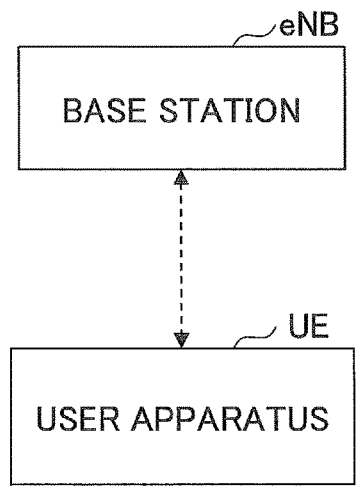
FIG. 1 is a drawing illustrating a structure example of a wireless communication system according to an embodiment.

In the following, referring to the drawings, embodiments of the present invention will be described. It should be noted that the embodiments described below are merely examples and the embodiments to which the present invention is applied are not limited to the following embodiments. For example, it is assumed that a wireless communication system according to an embodiment complies with LTE standards. However, the present invention can be applied not only to LTE but also to other schemes. It should be noted that, in the application specification and claims, the term "LTE" is used in a broader sense including a fifth generation communication method corresponding to 3GPP release 12, 13, 14 or later.

In the following descriptions, the term "VoLTE" is used to mean not only voice but also video and SMS.

<System Structure>

FIG. 1 is a drawing illustrating a structure example of a wireless communication system according to an embodiment. The wireless communication system uses an LTE scheme, and includes a user apparatus UE and a base station eNB as illustrated in FIG. 1. In FIG. 1, a single user apparatus UE and a single base station eNB are shown. However, this is only an example, and there may be multiple user apparatuses UE and multiple base stations eNB.

The base station eNB communicates with the user apparatus UE via radio. Further, the base station eNB generates broadcast information including regulation information based on information stored in a memory of the base station eNB or information transmitted from a core network, and transmits the broadcast information to the user apparatus UE.

The user apparatus UE has a function for communicating with the base station eNB, the core network, etc., via radio. It is assumed that the user apparatus UE is, for example, a smartphone. However, the user apparatus UE may be any device as long as it has a communication function.

<Establishment Cause>

First, "Establishment cause" defined in the current LTE will be described. In the current LTE, six Establishment causes, "emergency", "highPriorityAccess", "mt-Access", "mo-Signalling", "mo-Data", and "delayTolerantAccess" are defined.

The user apparatus UE determines an Establishment cause which should be set in an RRC connection request based on a NAS procedure, etc., performed by a NAS layer.

The specific procedure for determining the Establishment cause which should be set in the RRC connection request is defined in Table D.1.1 in NPL 2 for each NAS procedure (Attach, TrackingAreaUpdate, Detach, ServiceRequest).

As an example, in the case where the user apparatus UE transmits an attach request (Attach Request) in order to process a normal out-going call other than an emergency call, "mo-Signalling" is set as the Establishment cause. Further, in the case where the user apparatus UE transmits an attach request in order to process an emergency call, "emergency" is set as the Establishment cause. Further, in the case where a low priority (Low Priority) user apparatus UE transmits an attach request, "delayTolerantAccess" is set as the Establishment cause. Further, in the case where the user apparatus transmits a service request (Service Request) to the base station eNB in order to make a packet call (including a VoLTE call), "mo-Data" is set as the Establishment cause. Further, in the case where the user apparatus UE transmits a service request to the base station eNB in order to respond to a paging message in which a CN domain indicator is set to PS, "mt-Access" is set as the Establishment cause. Further, in the case where an access class of the user apparatus UE is any one of 11 to 15, "highPriorityAccess" is set as the Establishment cause regardless of the NAS procedure.

In the following descriptions, the "conventional Establishment cause" means any one of the six Establishment causes determined according to the above-described procedures defined in NPL 2.

<Overview>

Figure 2:
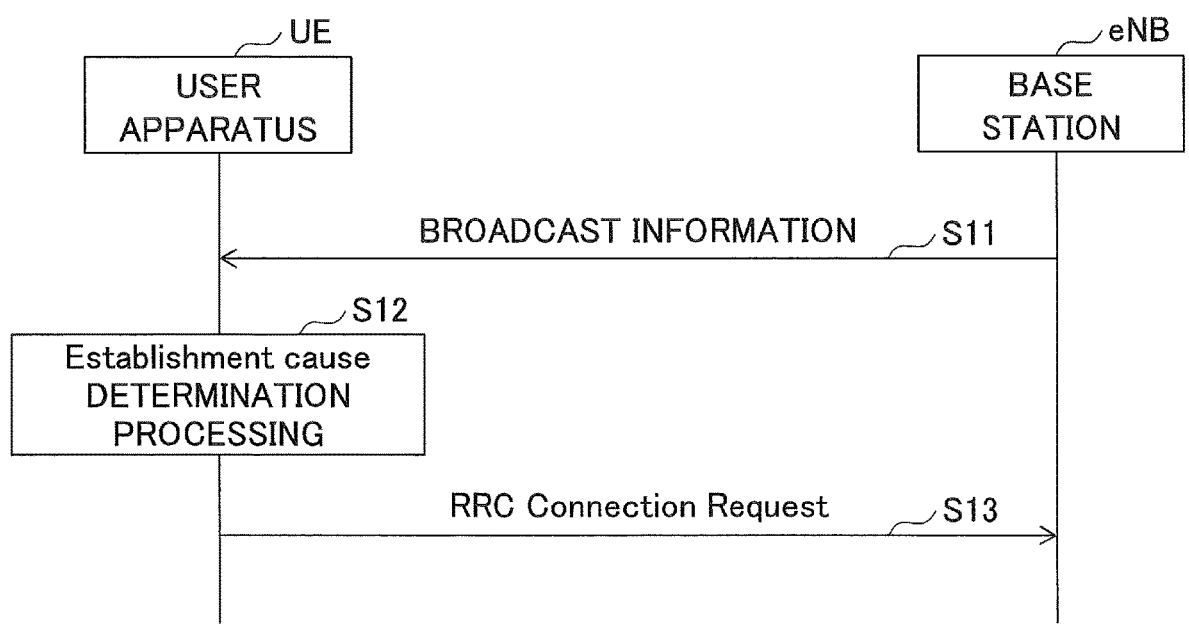
FIG. 2 is a sequence diagram illustrating processing steps of the wireless communication system.

FIG. 2 is a sequence diagram illustrating processing steps of a wireless communication system according to an embodiment.

In step S11, in the case where the base station eNB is capable of receiving (capable of determining/identifying) an Establishment cause indicating a VoLTE call (hereinafter, referred to as "Establishment cause for VoLTE"), the base station eNB sets an indicator indicating that the base station eNB is adapted to (corresponds to) "Establishment cause for VoLTE" (hereinafter, referred to as "indicator corresponding to (adapted to) Establishment cause for VoLTE") in the broadcast information and transmits the set result.

In step S12, in the case of making a VoLTE call, the user apparatus UE determines whether the "indicator corresponding to Establishment cause for VoLTE" is set in the broadcast information.

In step S13, the user apparatus UE sets an appropriate Establishment cause in an RRC connection request based on the determination result in step S12, and transmits the set result to the base station eNB.

More specifically, in the case where the "indicator corresponding to Establishment cause for VoLTE" is set in the broadcast information, the user apparatus UE sets the "Establishment cause for VoLTE" as the Establishment cause of the RRC connection request, and transmits the set result to the base station eNB. On the other hand, in the case where the "indicator corresponding to Establishment cause for VoLTE" is not set in the broadcast information, the user apparatus UE sets a "conventional Establishment cause" as the Establishment cause of the RRC connection request, and transmits the set result to the base station eNB.

<Functional Structure>

Figure 3:
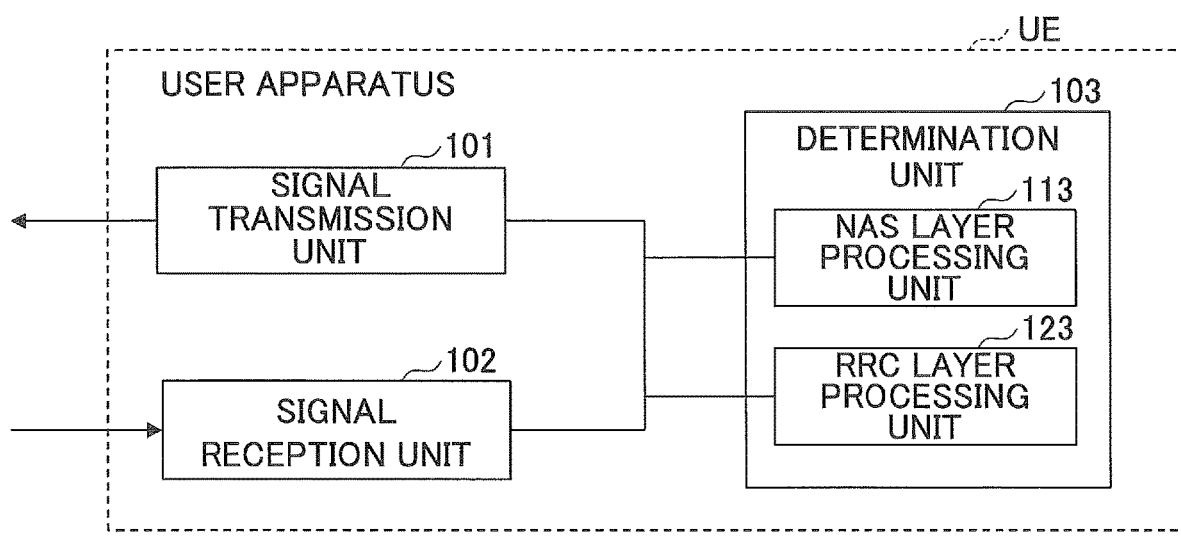
FIG. 3 is a drawing illustrating an example of a functional structure of a user apparatus according to an embodiment.

FIG. 3 is a drawing illustrating an example of a functional structure of a user apparatus UE according to an embodiment. As illustrated in FIG. 3, the user apparatus UE includes a signal transmission unit 101, a signal reception unit 102, and a determination unit 103. Further, the determination unit 103 includes a NAS layer processing unit 113 and an RRC layer processing unit 123. FIG. 3 illustrates functional units of the user apparatus UE especially related to an embodiment only, and thus, the user apparatus UE further includes at least functions for performing operations according to LTE (not shown in the figure). Further, a functional structure illustrated in FIG. 3 is merely an example. Functional classification and names of functional units may be anything as long as operations related to an embodiment can be performed.

The signal transmission unit 101 includes a function for generating various kinds of signals to be transmitted from the user apparatus UE and transmitting the generated signals. The signal reception unit 102 includes a function for receiving various kinds of radio signals from the base station eNB. It is assumed (but not limited) that the signal transmission unit 101 and the signal reception unit 102 each have packet buffers and perform processes of a layer 1 (PHY) and a layer 2 (MAC, RLC, PDCP).

The determination unit 103 includes a function for determining whether a predetermined indicator ("indicator corresponding to Establishment cause for VoLTE") is included in the broadcast information received from the base station eNB. Further, in the case where the user apparatus UE is going to make a VoLTE call and the predetermined indicator is included in the broadcast information received from the base station eNB, the determination unit 103 generates an RRC connection request message in which information indicating a request requesting an RRC connection to be established for making a VoLTE call (Establishment cause for VoLTE) is set, and transmits the generated message to the signal transmission unit 101. Further, in the case where the user apparatus UE is going to make a VoLTE call and the predetermined indicator is not included in the broadcast information received from the base station eNB, the determination unit 103 generates an RRC connection request message in which information indicating a request requesting an RRC connection to be established according to a predetermined cause (conventional Establishment cause) is set, and transmits the generated message to the signal transmission unit 101.

The NAS layer processing unit 113 includes a function for performing various kinds of processes related to the NAS layer including status management of the NAS layer and generation of NAS messages. Further, the NAS layer processing unit 113 transmits and receives NAS messages to and from the core network via the signal transmission unit 101 and the signal reception unit 102. Further, in the case of transmitting a NAS message, the NAS layer processing unit 113 requests the RRC layer processing unit 123 to establish an RRC connection. Further, in the case where the NAS layer processing unit 113 requests the RRC layer processing unit 123 to establish an RRC connection, the NAS layer processing unit 113 transmits the Establishment cause to be set in the RRC connection request to the RRC layer processing unit 123.

The RRC layer processing unit 123 includes functions for performing various kinds of processes related to the RRC layer including status management of the RRC layer, generation of RRC messages, and RRC message transmission and reception to and from the base station eNB. Further, the RRC layer processing unit 123 transmits and receives RRC messages to and from the base station eNB via the signal transmission unit 101 and the signal reception unit 102.

(Base Station)

Figure 4:
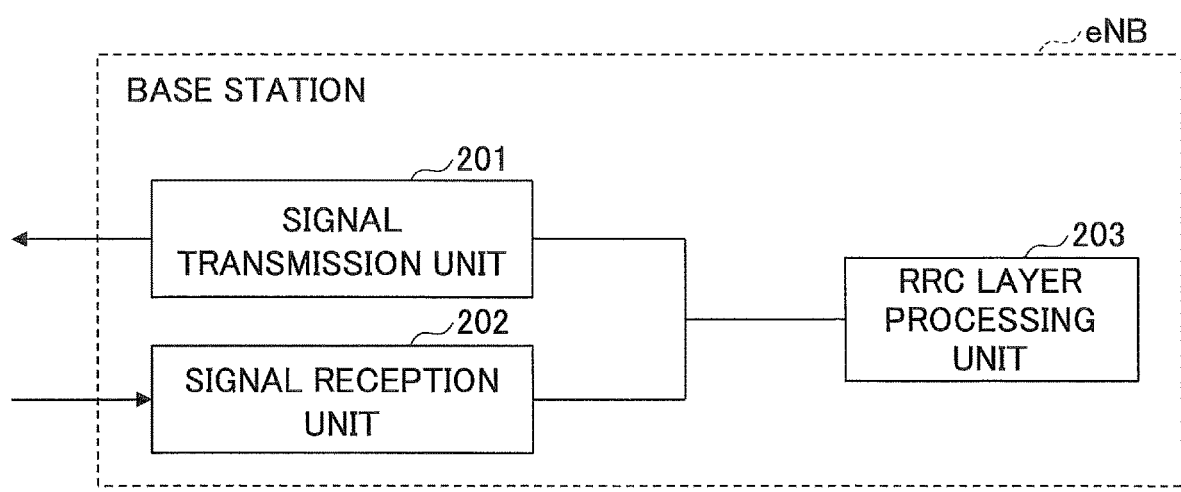
FIG. 4 is a drawing illustrating an example of a functional structure of a base station according to an embodiment.

FIG. 4 is a drawing illustrating an example of a functional structure of a base station eNB according to an embodiment. As illustrated in FIG. 4, the base station eNB includes a signal transmission unit 201, a signal reception unit 202, and an RRC layer processing unit 203. FIG. 4 illustrates functional units of the base station eNB especially related to an embodiment only, and thus, the base station eNB further includes at least functions for performing operations according to LTE (not shown in the figure). Further, a functional structure illustrated in FIG. 4 is merely an example. Functional classification and names of functional units may be anything as long as operations related to an embodiment can be performed.

The signal transmission unit 201 includes a function for wirelessly transmitting various kinds of physical layer signals generated from an upper layer signal which should be transmitted from the base station eNB. The signal reception unit 202 includes a function for wirelessly receiving various kinds of signals from the user apparatus UE, and obtaining upper layer signals from the received physical layer signals. It is assumed (but not limited) that the signal transmission unit 201 and the signal reception unit 202 each have packet buffers and perform processes of a layer 1 (PHY) and a layer 2 (MAC, RLC, PDCP).

The RRC layer processing unit 203 includes functions for performing various kinds of processes related to the RRC layer including status management of the RRC layer, generation of RRC messages, and RRC message transmission and reception to and from the user apparatus UE. Further, the RRC layer processing unit 203 includes a function for generating broadcast information, and transmits the generated broadcast information to the user apparatus UE via the signal transmission unit 201. Further, the RRC layer processing unit 203 determines whether to establish an RRC connection with the user apparatus UE according to the Establishment cause set in the RRC connection request received from the user apparatus UE.

The above-described functional structures of the user apparatus UE and the base station eNB may be entirely realized by a hardware circuit (e.g., one or more IC chips), or may be partially realized by a hardware circuit and the remaining part may be realized by a CPU and programs.

Figure 5:
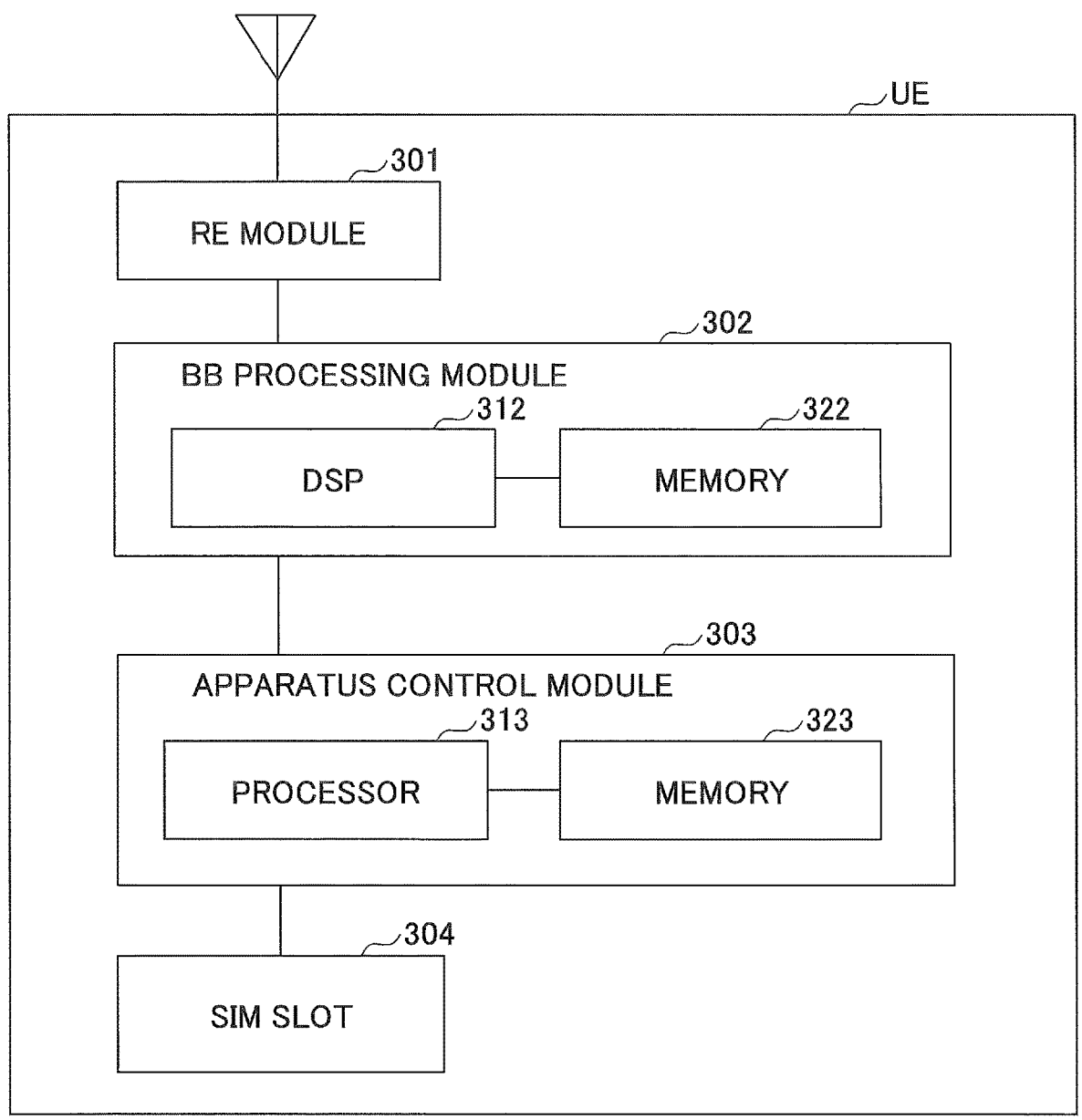
FIG. 5 is a drawing illustrating an example of a hardware configuration of the user apparatus.

FIG. 5 is a drawing illustrating an example of a hardware configuration of a user apparatus 1 according to an embodiment. FIG. 5 illustrates a structure closer to an implementation example compared to FIG. 3. As illustrated in FIG. 5, the user apparatus UE includes an RE (Radio Equipment) module 301 for performing a process related to a radio signal, a BB (base band) processing module 302 for performing baseband signal processing, an apparatus control module 303 for performing a process of an upper layer, etc., and a SIM slot 304 which is an interface used for accessing a SIM card.

The RE module 301 generates a radio signal to be transmitted from an antenna by performing digital-to-analog (D/A) conversion, modulation, frequency conversion, power amplification, etc., for a digital baseband signal received from the BB processing module 302. Further, the RE module 301 generates a digital baseband signal by performing frequency conversion, analog to digital (A/D) conversion, demodulation, etc., for a received radio signal, and transmits the generated signal to the BB processing module 302. The RE module 301 includes, for example, a part of the signal transmission unit 101 and a part of the signal reception unit 102 illustrated in FIG. 3.

The BB processing module 302 performs a process of converting bidirectionally between an IP packet and a digital baseband signal. A DSP (Digital signal processor) 312 is a processor for performing signal processing in the BB processing module 302. A memory 322 is used as a work area of the DSP 312. The BB processing module 302 includes, for example, a part of the signal transmission unit 101 and a part of the signal reception unit 102 illustrated in FIG. 3.

The apparatus control module 303 performs an IP layer protocol process, processes of various types of applications, etc. A processor 313 performs processing for the apparatus control module 303. A memory 323 is used as a work area of the processor 313. Further, the processor 313 writes and reads data to and from a SIM via the SIM slot 304. The apparatus control module 303 includes, for example, the determination unit 103, the NAS layer processing unit 113 and the RRC layer processing unit 123 illustrated in FIG. 3.

Figure 6:
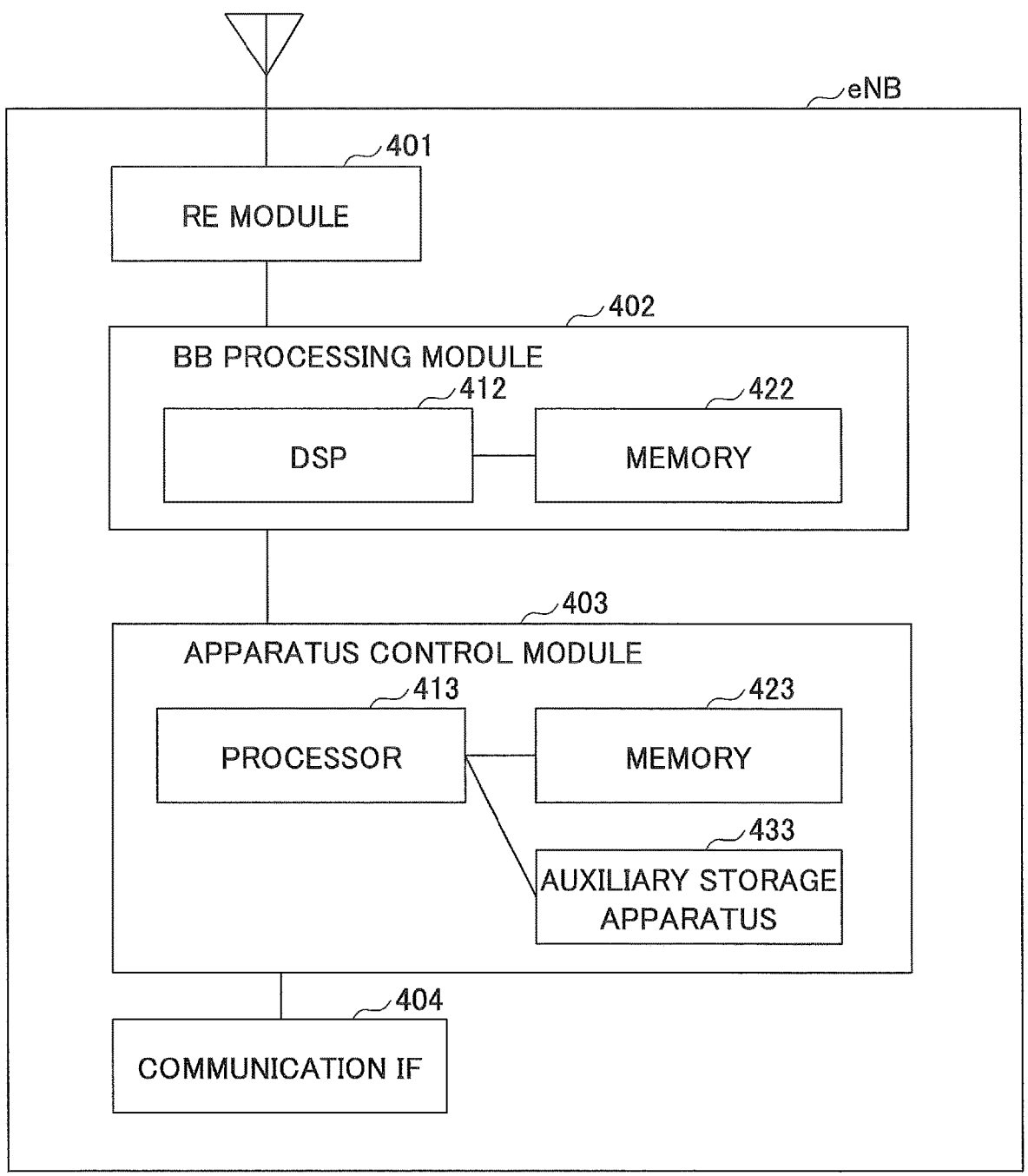
FIG. 6 is a drawing illustrating an example of a hardware configuration of the base station.

FIG. 6 is a drawing illustrating an example of a hardware configuration of a base station 2 according to an embodiment. FIG. 6 illustrates a structure closer to an implementation example compared to FIG. 4. As illustrated in FIG. 6, the base station eNB includes an RE module 401 for performing a process related to a wireless signal, a BB processing module 402 for performing a baseband signal process, an apparatus control module 403 for performing a process of an upper layer, etc., and a communication IF 404 as an interface for connecting to a network.

The RE module 401 generates a radio signal to be transmitted from an antenna by performing D/A conversion, modulation, frequency conversion, power amplification, etc., for a digital baseband signal received from the BB processing module 402. Further, the RE module 401 generates a digital baseband signal by performing frequency conversion, A/D conversion, demodulation, etc., for a received radio signal, and transmits the generated signal to the BB processing module 402. The RE module 401 includes, for example, a part of the signal transmission unit 201 and a part of the signal reception unit 202 illustrated in FIG. 4.

The BB processing module 402 performs a process of converting bidirectionally between an IP packet and a digital baseband signal. DSP 412 is a processor for performing a signal processing in the BB processing module 402. A memory 422 is used as a work area of the DSP 412. The BB processing module 402 includes, for example, a part of the signal transmission unit 201 and a part of the signal reception unit 202 illustrated in FIG. 4.

The apparatus control module 403 performs an IP layer protocol process, an operation and maintenance (OAM) process, etc. A processor 413 performs processing for the apparatus control module 403. A memory 423 is used as a work area of the processor 413. An auxiliary storage apparatus 433 is, for example, a HDD, etc., and stores various types of setting information items, etc., used for operations of the base station eNB. The apparatus control module 403 includes, for example, the cooperation information exchange unit 203 illustrated in FIG. 4.

<Processing Steps>
(Base Station)

Next, referring to the drawings, examples of processing steps performed by a base station eNB and a user apparatus UE according to an embodiment will be described.

Figure 7:
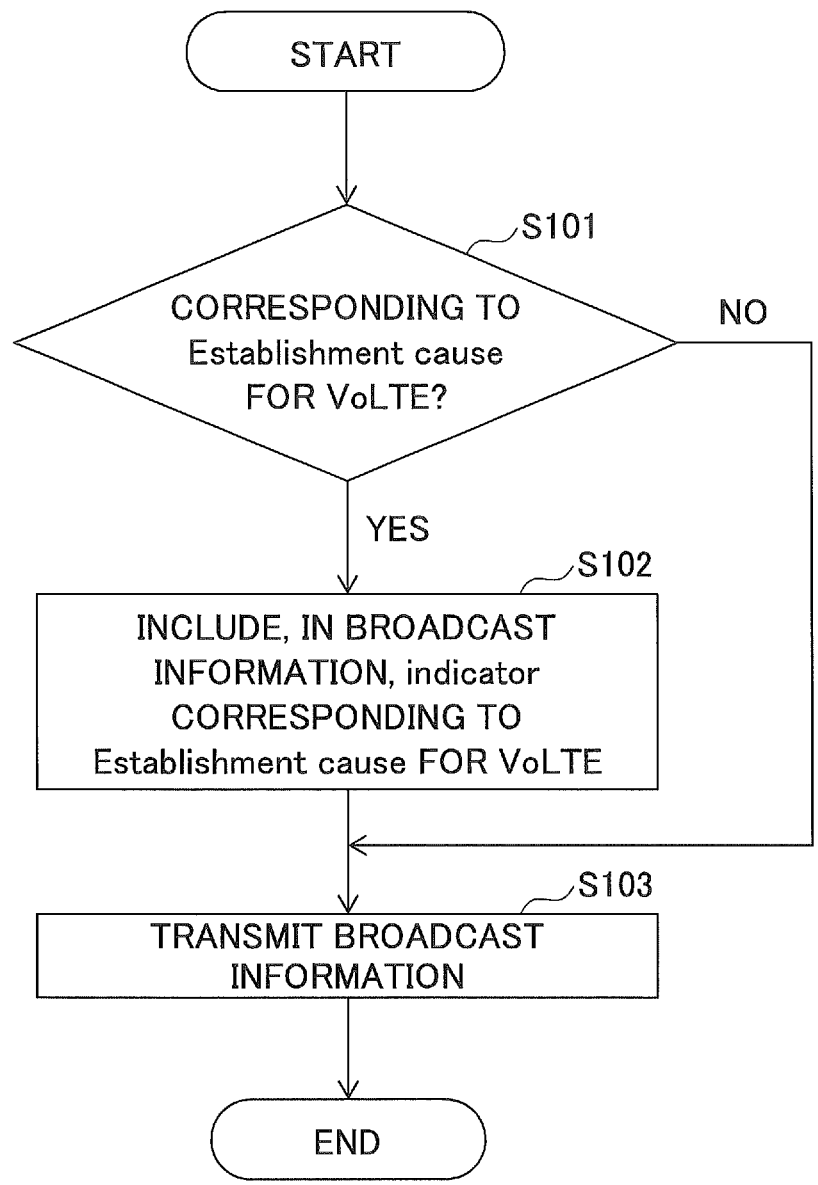
FIG. 7 is a flowchart illustrating processing steps performed by the base station.

FIG. 7 is a flowchart illustrating processing steps performed by the base station. It should be noted that the processing steps illustrated in FIG. 7 indicate processing steps performed by a base station eNB that is adapted to (that is capable of receiving/determining/recognizing) "Establishment cause for VoLTE" in the RRC layer processing unit 203.

In step S101, the RRC layer processing unit 203 of the base station eNB proceeds to processing steps of S102 in the case where the base station eNB is adapted to (corresponds to) "Establishment cause for VoLTE" based on the network operations, etc., and proceeds to processing steps of S103 in the case where the base station eNB is not adapted to (in the case where the base station eNB does not accept) "Establishment cause for VoLTE".

In step S102, the RRC layer processing unit 203 of the base station eNB sets an indication corresponding to Establishment cause for VoLTE in the broadcast information (e.g., SIB1).

In step S103, the RRC layer processing unit 203 of the base station eNB transmits the broadcast information to the user apparatus UE via the signal transmission unit 201.

(User Apparatus)

Next, referring to the drawings, multiple sets of processing steps performed by a user apparatus UE according to an embodiment will be described.

[Processing Steps (No. 1)]

Figure 8:
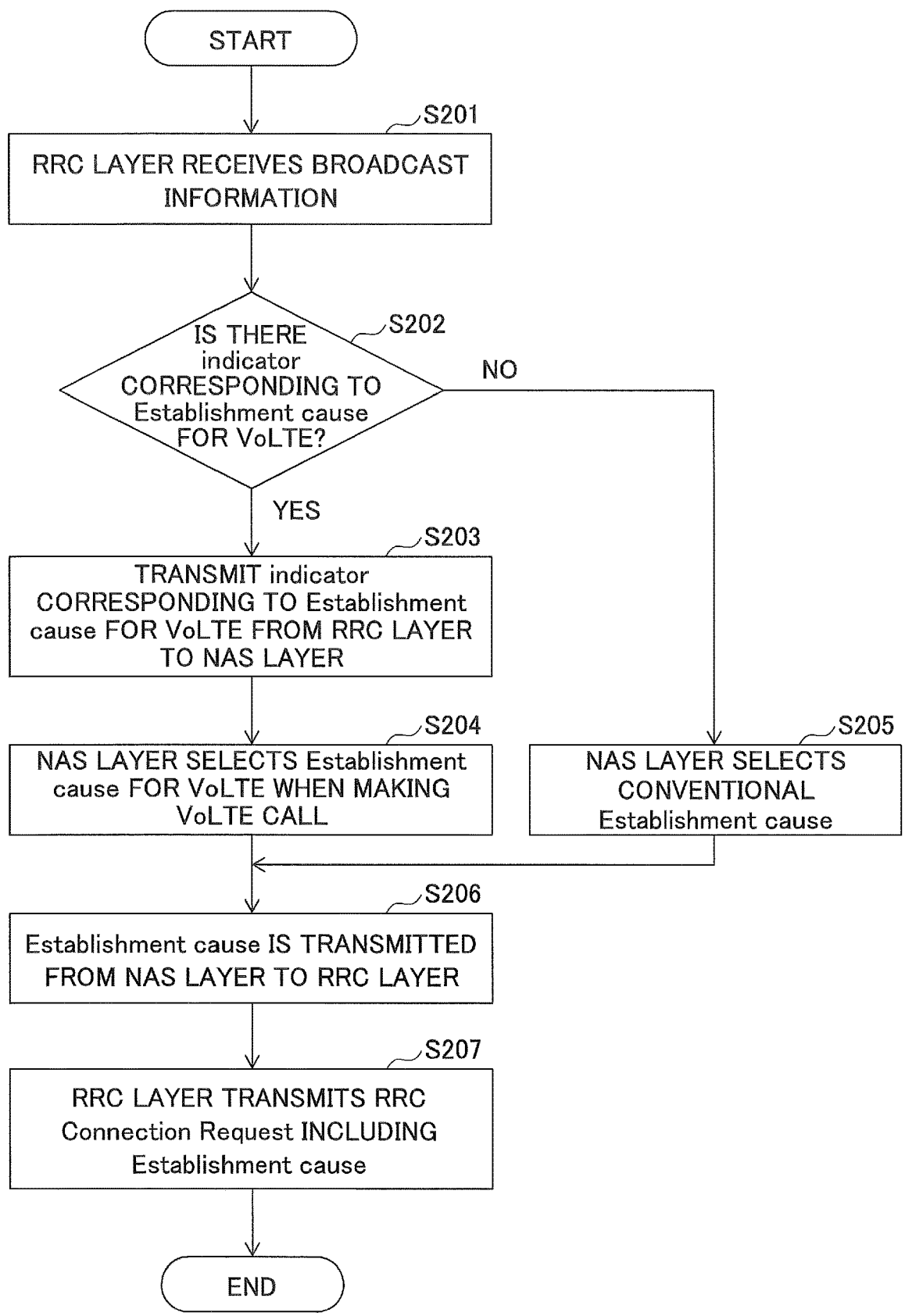
FIG. 8 is a flowchart illustrating processing steps performed by the user apparatus (No. 1).

FIG. 8 is a flowchart illustrating processing steps performed by the user apparatus (No. 1). In the processing steps (No. 1), it is the NAS layer processing unit 113 that selects the Establishment cause to be set in an RRC connection request.

In step S201, the RRC layer processing unit 123 of the user apparatus UE receives the broadcast information transmitted from the base station eNB.

In step S202, the RRC layer processing unit 123 of the user apparatus UE determines whether an "indicator corresponding to Establishment cause for VoLTE" is set in the broadcast information. The process proceeds to step S203 in the case where the "indicator corresponding to Establishment cause for VoLTE" is set in the broadcast information, and proceeds to step S205 in the case where the "indicator corresponding to Establishment cause for VoLTE" is not set in the broadcast information.

In step S203, the RRC layer processing unit 123 of the user apparatus UE reports to the NAS layer processing unit 113 that the "indicator corresponding to Establishment cause for VoLTE" is set in the broadcast information.

In step S204, in the case of making a VoLTE call, the NAS layer processing unit 113 of the user apparatus UE selects the "Establishment cause for VoLTE" as the Establishment cause to be set in the RRC connection request. It should be noted that, in the case of making a call other than the VoLTE call, the NAS layer processing unit 113 selects a "conventional Establishment cause" as the Establishment cause to be set in the RRC connection request.

In step S205, the NAS layer processing unit 113 of the user apparatus UE selects a "conventional Establishment cause" as the Establishment cause to be set in the RRC connection request.

In step S206, the NAS layer processing unit 113 of the user apparatus UE transmits the selected Establishment cause to be set in the RRC connection request to the RRC layer processing unit 123.

In step S207, the RRC layer processing unit 123 of the user apparatus UE sets the Establishment cause transmitted in processing steps of S206 in the RRC connection request, and transmits the set result to the base station eNB.

[Processing Steps (No. 2)]

Figure 9:
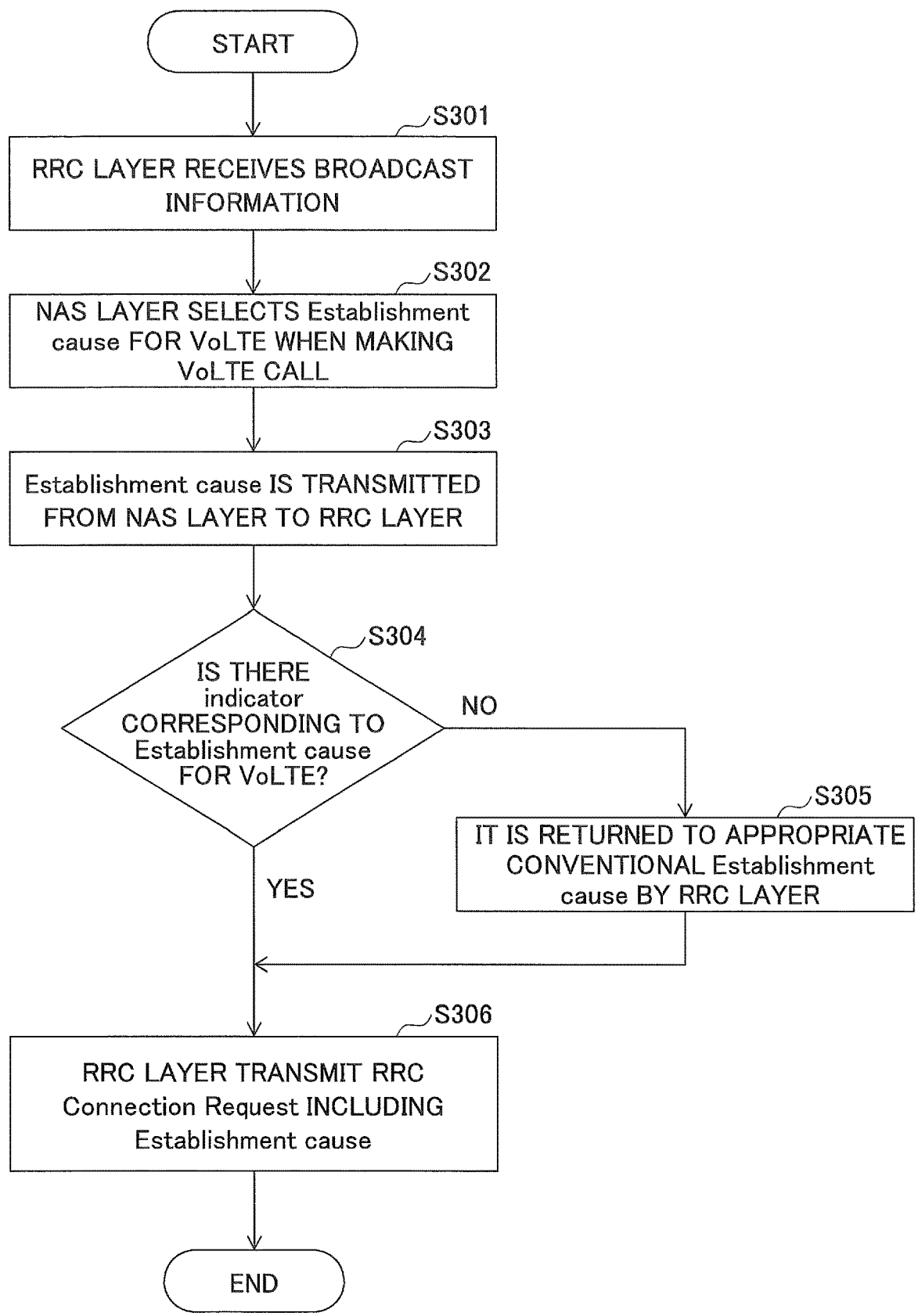
FIG. 9 is a flowchart illustrating processing steps performed by the user apparatus (No. 2).

FIG. 9 is a flowchart illustrating processing steps performed by the user apparatus (No. 2). In the processing steps (No. 2), in the case of making a VoLTE call, it is the RRC layer processing unit 123 that selects an appropriate Establishment cause to be set in an RRC connection request.

In step S301, the RRC layer processing unit 123 of the user apparatus UE receives the broadcast information transmitted from the base station eNB. In step S302, in the case of making a VoLTE call, the NAS layer processing unit 113 of the user apparatus UE selects the "Establishment cause for VoLTE" as the Establishment cause to be set in the RRC connection request. It should be noted that, in the case of making a call other than the VoLTE call, the NAS layer processing unit 113 selects a "conventional Establishment cause" as the Establishment cause to be set in the RRC connection request.

In step S303, the NAS layer processing unit 113 of the user apparatus UE transmits the selected Establishment cause to be set in the RRC connection request to the RRC layer processing unit 123.

In step S304, the RRC layer processing unit 123 of the user apparatus UE determines whether the "indicator corresponding to Establishment cause for VoLTE" is set in the broadcast information. The process proceeds to step S306 in the case where the "indicator corresponding to Establishment cause for VoLTE" is set in the broadcast information, and proceeds to step S305 in the case where the "indicator corresponding to Establishment cause for VoLTE" is not set in the broadcast information.

In step S305, in the case where the Establishment cause to be set in the RRC connection request transmitted in processing step S303 is the "Establishment cause for VoLTE", the RRC layer processing unit 123 of the user apparatus UE determines that a "conventional Establishment cause" should be selected as the Establishment cause to be set in the RRC connection request, and selects an appropriate "conventional Establishment causer" at its own discretion.

It should be noted that the RRC layer processing unit 123 may obtain from the NAS layer processing unit 113 a status, etc., of the NAS procedure performed in the NAS layer, and may select a "conventional Establishment cause" according to the procedure defined in Table D.1.1 of NPL 2.

As another method, in processing step S303, the RRC layer processing unit 123 may obtain in advance from the NAS layer processing unit 113 the "Establishment cause for VoLTE" and a "conventional Establishment cause" as the Establishment cause to be set in the RRC connection request in the case of making a VoLTE call. It is possible for the RRC layer processing unit 123 to select a "conventional Establishment cause" without performing the procedure defined in Table D.1.1 of NPL 2 at its own discretion.

In step S306, in the case where it is determined that the "Establishment cause for VoLTE" is set in the broadcast information in processing step S304, the RRC layer processing unit 123 of the user apparatus UE sets the Establishment cause transmitted from the NAS layer 113 in processing step S303 in the RRC connection request, and transmits the set result to the base station eNB.

On the other hand, in the case where it is determined that the "Establishment cause for VoLTE" is not set in the broadcast information in processing step S304, the RRC layer processing unit 123 of the user apparatus UE sets the Establishment cause selected in processing step S305 in the RRC connection request, and transmits the set result to the base station eNB.

[Processing Steps (No. 3)]

Figure 10:
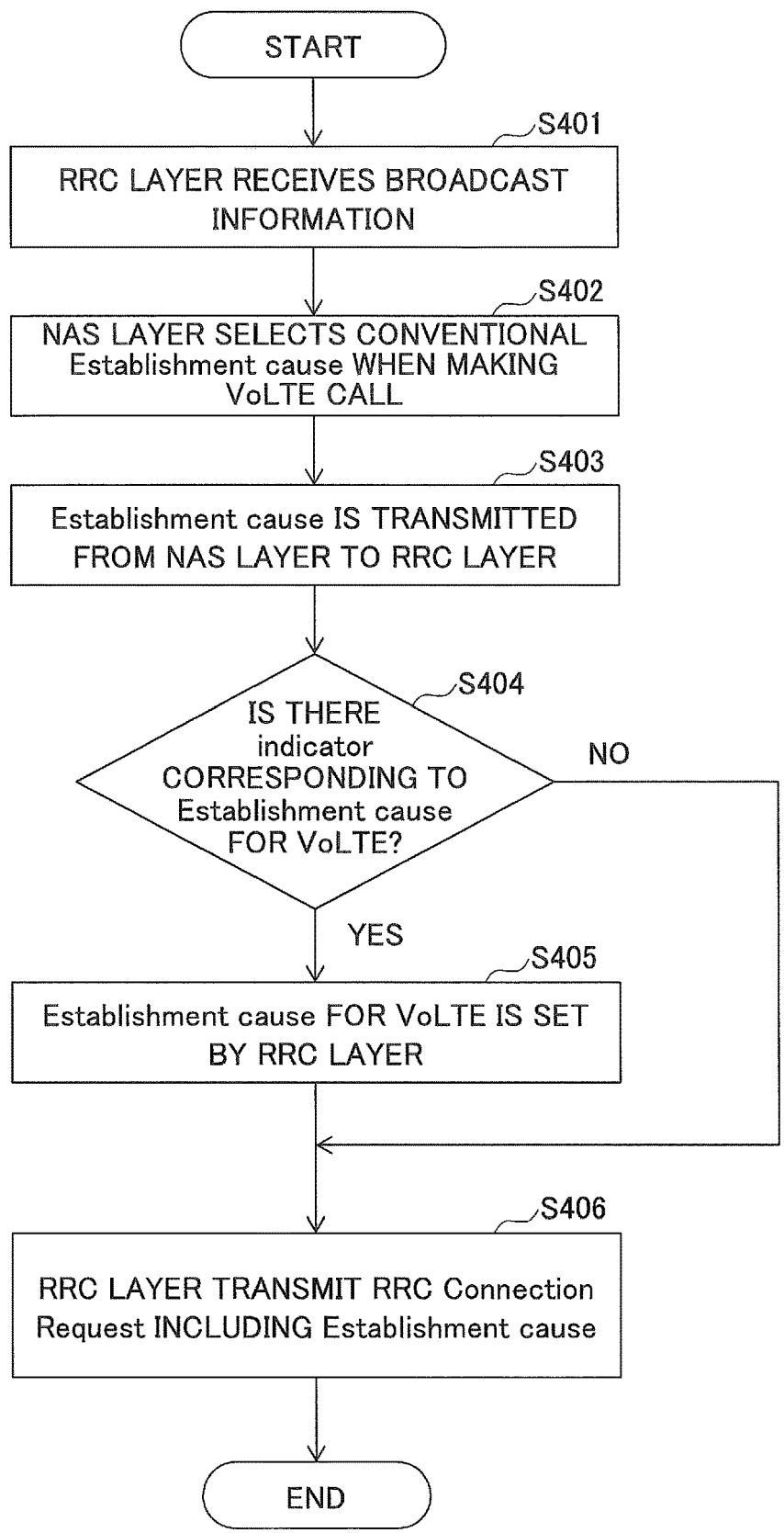
FIG. 10 is a flowchart illustrating processing steps performed by the user apparatus (No. 3).

FIG. 10 is a flowchart illustrating processing steps performed by the user apparatus (No. 3). In the processing steps (No. 3), similar to the processing steps (No. 2), in the case of making a VoLTE call, it is the RRC layer processing unit 123 that selects an appropriate Establishment cause to be set in an RRC connection request.

In step S401, the RRC layer processing unit 123 of the user apparatus UE receives the broadcast information transmitted from the base station eNB.

In step S402, in the case of making a VoLTE call, the NAS layer processing unit 113 of the user apparatus UE selects a "conventional Establishment cause" as the Establishment cause to be set in the RRC connection request. It should be noted that, in the case of making a call other than the VoLTE call, the NAS layer processing unit 113 also selects a "conventional Establishment cause" as the Establishment cause to be set in the RRC connection request.

In step S403, the NAS layer processing unit 113 of the user apparatus UE transmits the Establishment cause to be set in the RRC connection request to the RRC layer processing unit 123. Further, the NAS layer processing unit 113 reports to the RRC layer processing unit 123 on whether a VoLTE call is going to be made or a call other than the VoLTE call is going to be made. The report may be performed by using "Call type" defined in the 3GPP standard specifications (NPL 2).

In step S404, the RRC layer processing unit 123 of the user apparatus UE determines whether the "indicator corresponding to Establishment cause for VoLTE" is set in the broadcast information. The process proceeds to step S405 in the case where the "indicator corresponding to Establishment cause for VoLTE" is set in the broadcast information, and proceeds to step S406 in the case where the "indicator corresponding to Establishment cause for VoLTE" is not set in the broadcast information.

In step S405, in the case where it has been reported to the RRC layer processing unit 123 of the user apparatus UE by the NAS layer processing unit 113 in processing step S403 that the VoLTE call is going to be made, the RRC layer processing unit 123 of the user apparatus UE determines that the RRC layer processing unit 123 should select the "Establishment cause for VoLTE call" as the Establishment cause to be set in the RRC connection request.

On the other hand, in the case where it has been reported to the RRC layer processing unit 123 of the user apparatus UE by the NAS layer processing unit 113 in processing steps of S403 that a call other than the VoLTE call is going to be made, the RRC layer processing unit 123 of the user apparatus UE determines that the Establishment cause to be set in the RRC connection request is the Establishment cause transmitted from the NAS layer processing unit 113 in processing step S402 (conventional Establishment cause).

In step S406, in the case where it is determined that the "indicator corresponding to Establishment cause for VoLTE" is set in the broadcast information in processing step S404, the RRC layer processing unit 123 of the user apparatus UE sets the Establishment cause determined to be selected in processing step S405 in the RRC connection request, and transmits the set result to the base station eNB.

On the other hand, in the case where it is determined that the "indicator corresponding to Establishment cause for VoLTE" is not set in the broadcast information in processing step S404, the RRC layer processing unit 123 of the user apparatus UE sets the Establishment cause transmitted from the NAS layer 113 in processing step S403 in the RRC connection request, and transmits the set result to the base station eNB.

<Processing Steps (Modified Example)>

In the above-described processing steps, in the case where a VoLTE call is going to be made, the user apparatus UE sets the "Establishment cause for VoLTE" in the RRC connection request regardless of an access class of the user apparatus UE.

On the other hand, in the processing steps (modified example), in the case where a VoLTE call is going to be made and where the access class of the user apparatus UE is any one of 11 to 15, the user apparatus UE sets the Establishment cause indicating a VoLTE call from a user apparatus UE with an access class 11 to 15 (hereinafter, referred to as "High Priority Access Establishment cause for VoLTE") as the Establishment cause of the RRC connection request, and transmits the set result to the base station eNB. Further, the above-described "Establishment cause for VoLTE" means an Establishment cause indicating a VoLTE call from a user apparatus UE with an access class other than 11 to 15 (that is, any one of access classes 0 to 9).

With the above arrangement, in the case where an RRC connection request is received, it is possible for the base station eNB to determine whether a user apparatus UE with an access class 0 to 9 is going to make a VoLTE call, or, a user apparatus UE with an access class 11 to 15 is going to make a VoLTE call. Further, it is possible for the base station eNB to perform a regulation control according to the access class of the user apparatus UE in such a way that, for example, a VoLTE call from a user apparatus UE with an access class 0 to 9 is regulated and a VoLTE call from a user apparatus UE with an access class 11 to 15 is not regulated.

In the following, specific processing steps in the modified example will be described. The NAS layer processing unit 113 and/or the RRC layer processing unit 123 include a function for obtaining (determining/identifying) its own access class. In the case where its own access class is other than 11 to 15 (that is, any one of access classes 0 to 9), the NAS layer processing unit 113 and/or the RRC layer processing unit 123 operate(s) according to the processing steps described above (No. 1) to (No. 3). On the other hand, in the case where its own access class is any one of 11 to 15, the NAS layer processing unit 113 and/or the RRC layer processing unit 123 operate(s) according to the modified example of the processing steps described below.

[Processing Steps (Modified Example 1-1)]

Referring to FIG. 8, processing steps (modified example 1-1) will be described. In the processing steps (modified example 1-1), it is assumed that the NAS layer processing unit 113 has already determined that its own access class is any one of 11 to 15. It should be noted that descriptions of processing steps that are the same as the above-described processing steps (No. 1) will be omitted.

In step S204, in the case of making a VoLTE call, the NAS layer processing unit 113 of the user apparatus UE selects the "High Priority Access Establishment cause for VoLTE" as the Establishment cause to be set in the RRC connection request. It should be noted that, in the case of making a call other than the VoLTE call, the NAS layer processing unit 113 selects the "highPriorityAccess" as the Establishment cause to be set in the RRC connection request.

In step S205, the NAS layer processing unit 113 of the user apparatus UE selects the "highPriorityAccess" as the Establishment cause to be set in the RRC connection request.

[Processing Steps (Modified Example 1-2)]

Referring to FIG. 8, processing steps (modified example 1-2) will be described. In the processing steps (modified example 1-1), it is assumed that the NAS layer processing unit 113 has already determined that its own access class is any one of 11 to 15. In the processing steps (modified example 1-2), it is assumed that the RRC layer processing unit 123 has already determined that its own access class is any one of 11 to 15.

It should be noted that descriptions of processing steps that are the same as the above-described processing steps (No. 1) will be omitted.

In step S204, in the case of making a VoLTE call, the NAS layer processing unit 113 of the user apparatus UE selects the "Establishment cause for VoLTE" as the Establishment cause. It should be noted that, in the case of making a call other than the VoLTE call, the NAS layer processing unit 113 selects a "conventional Establishment cause" as the Establishment cause to be set in the RRC connection request.

In step S207, the RRC layer processing unit 123 of the user apparatus UE determines that its own access class is any one of 11 to 15, sets an appropriate Establishment cause corresponding to a case of access classes 11 to 15 in the RRC connection request, and transmits the set result to the base station eNB.

Specifically, in the case where the Establishment cause transmitted in processing step S206 is "Establishment cause for VoLTE", the RRC layer processing unit 123 sets the "High Priority Access Establishment cause for VoLTE" in the RRC connection request, and transmits the set result to the base station eNB.

Further, in the case where the Establishment cause transmitted in processing step S206 is a "conventional Establishment cause", the RRC layer processing unit 123 sets the "High Priority Access" in the RRC connection request, and transmits the set result to the base station eNB.

[Processing Steps (Modified Example 2-1)]

Referring to FIG. 9, processing steps (modified example 2-1) will be described. In the processing steps (modified example 2-1), it is assumed that the NAS layer processing unit 113 has already determined that its own access class is any one of 11 to 15. It should be noted that descriptions of processing steps that are the same as the above-described processing steps (No. 2) will be omitted.

In step S302, in the case of making a VoLTE call, the NAS layer processing unit 113 of the user apparatus UE selects the "High Priority Access Establishment cause for VoLTE" as the Establishment cause to be set in the RRC connection request. It should be noted that, in the case of making a call other than the VoLTE call, the NAS layer processing unit 113 selects the "highPriorityAccess" as the Establishment cause to be set in the RRC connection request.

In step S305, in the case where the Establishment cause to be set in the RRC connection request transmitted in processing step S303 is the "High Priority Access Establishment cause for VoLTE", the RRC layer processing unit 123 of the user apparatus UE selects the "highPriorityAccess" as the Establishment cause to be set in the RRC connection request.

[Processing Steps (Modified Example 2-2)]

Referring to FIG. 9, processing steps (modified example 2-2) will be described. In the processing steps (modified example 2-2), it is assumed that the RRC layer processing unit 123 has already determined that its own access class is any one of 11 to 15.

It should be noted that descriptions of processing steps that are the same as the above-described processing steps (No. 2) will be omitted.

In step S302, in the case of making a VoLTE call, the NAS layer processing unit 113 of the user apparatus UE selects the "Establishment cause for VoLTE" as the Establishment cause to be set in the RRC connection request. It should be noted that, in the case of making a call other than the VoLTE call, the NAS layer processing unit 113 selects a "conventional Establishment cause" as the Establishment cause to be set in the RRC connection request.

In step S305, in the case where the Establishment cause to be set in the RRC connection request transmitted in processing step S303 is the "Establishment cause for VoLTE", the RRC layer processing unit 123 of the user apparatus UE selects a "conventional Establishment cause" as the Establishment cause to be set in the RRC connection request.

In step S306, the RRC layer processing unit 123 of the user apparatus UE determines that its own access class is any one of 11 to 15, sets an appropriate Establishment cause corresponding to a case of access classes 11 to 15 in the RRC connection request, and transmits the set result to the base station eNB.

Specifically, in the case where it is determined that the "indicator corresponding to Establishment cause for VoLTE" is set in the broadcast information in processing step S304 and where the Establishment cause transmitted from the NAS layer processing unit 113 in processing step S303 is the "Establishment cause for VoLTE", the RRC layer processing unit 123 sets the "High Priority Access Establishment cause for VoLTE" in the RRC connection request, and transmits the set result to the base station eNB. Further, in the case where it is determined that the "indicator corresponding to Establishment cause for VoLTE" is set in the broadcast information in processing step S304 and where the Establishment cause transmitted from the NAS layer processing unit 113 in processing step S303 is a "conventional Establishment cause", the RRC layer processing unit 123 sets the "High Priority Access" in the RRC connection request, and transmits the set result to the base station eNB.

On the other hand, in the case where it is determined that the "indicator corresponding to Establishment cause for VoLTE" is not set in the broadcast information in processing step S304, the RRC layer processing unit 123 of the user apparatus UE sets, as a replacement for the "High Priority Access", the "conventional Establishment cause" selected in processing step S305 in the RRC connection request, and transmits the set result to the base station eNB.

[Processing Steps (Modified Example 3-1)]

Referring to FIG. 10, processing steps (modified example 3-1) will be described. In the processing steps (modified example 3-1), it is assumed that the NAS layer processing unit 113 has already determined that its own access class is any one of 11 to 15. It should be noted that descriptions of processing steps that are the same as the above-described processing steps (No. 3) will be omitted.

In step S402, in the case of making a VoLTE call, the NAS layer processing unit 113 of the user apparatus UE selects the "highPriorityAccess" as the Establishment cause to be set in the RRC connection request. It should be noted that, in the case of making a call other than the VoLTE call, the NAS layer processing unit 113 also selects the "highPriorityAccess" as the Establishment cause to be set in the RRC connection request.

In step S405, in the case where it has been reported to the RRC layer processing unit 123 of the user apparatus UE by the NAS layer processing unit 113 in processing step S403 that the VoLTE call is going to be made, the RRC layer processing unit 123 of the user apparatus UE determines that the RRC layer processing unit 123 should select the "High Priority Access Establishment cause for VoLTE" as the Establishment cause to be set in the RRC connection request.

On the other hand, in the case where it has been reported to the RRC layer processing unit 123 of the user apparatus UE by the NAS layer processing unit 113 in processing step S403 that a call other than the VoLTE call is going to be made, the RRC layer processing unit 123 of the user apparatus UE determines that the Establishment cause to be set in the RRC connection request is the Establishment cause transmitted from the NAS layer processing unit 113 in processing step S402 (highPriorityAccess).

[Processing Steps (Modified Example 3-2)]

Referring to FIG. 10, processing steps (modified example 3-2) will be described. In the processing steps (modified example 3-2), it is assumed that the RRC layer processing unit 123 has already determined that its own access class is any one of 11 to 15.

It should be noted that descriptions of processing steps that are the same as the above-described processing steps (No. 3) will be omitted.

In step S405, in the case where it has been reported to the RRC layer processing unit 123 of the user apparatus UE by the NAS layer processing unit 113 in processing step S403 that the VoLTE call is going to be made, the RRC layer processing unit 123 of the user apparatus UE determines that the RRC layer processing unit 123 should select the "High Priority Access Establishment cause for VoLTE" as the Establishment cause to be set in the RRC connection request.

On the other hand, in the case where it has been reported to the RRC layer processing unit 123 of the user apparatus UE by the NAS layer processing unit 113 in processing step S403 that a call other than the VoLTE call is going to be made, the RRC layer processing unit 123 of the user apparatus UE determines that the Establishment cause to be set in the RRC connection request is the "High Priority Access".

In step S406, in the case where it is determined that the "indicator corresponding to Establishment cause for VoLTE" is set in the broadcast information in processing step S404, the RRC layer processing unit 123 of the user apparatus UE sets the Establishment cause determined to be selected in processing step S405 in the RRC connection request, and transmits the set result to the base station eNB.

On the other hand, in the case where it is determined that the "indicator corresponding to Establishment cause for VoLTE" is not set in the broadcast information in processing step S404, the RRC layer processing unit 123 of the user apparatus UE sets the "High Priority Access" in the RRC connection request, and transmits the set result to the base station eNB.

<Summary>

As described above, a user apparatus according to an embodiment is provided. The user apparatus communicates with a base station, and includes a determination unit configured to, in the case of making a VoLTE call, determine whether a predetermined indicator is included in broadcast information received from the base station; and a transmission unit configured to transmit to the base station an RRC connection request message in which information indicating a request requesting an RRC connection to be established for making a VoLTE call is included. According to the user apparatus UE described above, a technique is provided in which it is possible to set an appropriate Establishment cause when making a VoLTE call.

Further, the determination unit may include a NAS layer processing unit and an RRC layer processing unit. The RRC layer processing unit may transmit a report to the NAS layer processing unit reporting whether the predetermined indicator is included in the broadcast information. In the case where the NAS layer processing unit receives a report reporting that the predetermined indicator is included in the broadcast information, the NAS layer processing unit may transmit to the RRC layer processing unit information indicating a request requesting an RRC connection to be established for making the VoLTE call. The transmission unit may transmit to the base station an RRC connection request message in which the information transmitted from the RRC layer processing unit indicating a request requesting an RRC connection to be established for making the VoLTE call is set. With the above arrangement, it is possible to set an appropriate Establishment cause in the NAS layer.

Further, the determination unit may include a NAS layer processing unit and an RRC layer processing unit. The NAS layer processing unit may transmit to the RRC layer processing unit information indicating a request requesting an RRC connection to be established for making the VoLTE call. In the case where the predetermined indicator is included in the broadcast information, the RRC layer processing unit may transmit to the transmission unit an RRC connection request message in which the information indicating a request requesting an RRC connection to be established for making the VoLTE call is included. The transmission unit may transmit to the base station the RRC connection request message in which the information indicating a request requesting an RRC connection to be established for making the VoLTE call is included. With the above arrangement, it is possible to set an appropriate Establishment cause in the RRC layer.

Further, the determination unit may include a NAS layer processing unit and an RRC layer processing unit. The NAS layer processing unit may transmit to the RRC layer processing unit information indicating a request requesting an RRC connection to be established according to a predetermined cause. In the case where the predetermined indicator is included in the broadcast information, the RRC layer processing unit may transmit to the transmission unit an RRC connection request message in which information indicating a request requesting an RRC connection to be established for making the VoLTE call is included instead of information indicating a request requesting an RRC connection to be established according to the predetermined cause. The transmission unit may transmit to the base station the RRC connection request message transmitted by the RRC layer processing unit in which the information indicating a request requesting an RRC connection to be established for making the VoLTE call is included. With the above arrangement, it is possible to set an appropriate Establishment cause in the RRC layer. Further, it is not necessary for the NAS layer to set the "Establishment cause for VoLTE" or the "High Priority Access Establishment cause for VoLTE", and thus, processing steps defined in the current LTE can be used.

Further, the predetermined indicator may indicate whether the base station eNB is adapted to the Establishment cause indicating a VoLTE call. With the above arrangement, it is possible for the base station eNB to specifically indicate (report) to the user apparatus UE that the base station eNB is adapted to (is capable of accepting or receiving) the Establishment cause indicating a VoLTE call.

The information indicating a request requesting an RRC connection to be established for making a VoLTE call may be information indicating a request requesting an RRC connection to be established for a high priority user apparatus to make a VoLTE call. With the above arrangement, it is possible for the user apparatus UE to transmit information to the base station eNB indicating that the call is a VoLTE call from a user apparatus UE of access class 11 to 15.

Further, according to an embodiment, an indication method performed by a user apparatus that communicates with a base station is provided. The indication method includes determining whether a predetermined indicator is included in broadcast information received from the base station in the case of making a VoLTE call; and transmitting to the base station an RRC connection request message in which information indicating a request requesting an RRC connection to be established for making a VoLTE call is set. According to the indication method described above, a technique is provided in which it is possible to set an appropriate Establishment cause when making a VoLTE call.

Supplementary Description of Embodiment

In an embodiment, the NAS layer processing unit 113 or the RRC layer processing unit 123 may select "emergency" as the Establishment cause to be set in the RRC connection request in the case where the VoLTE call is an emergency call. Further, the NAS layer processing unit 113 or the RRC layer processing unit 123 may select the "highPriorityAccess" as the Establishment cause to be set in the RRC connection request in the case where an access class of the user apparatus UE is any one of 11 to 15 even when making a VoLTE call.

An embodiment may be applied to a case in which only a single kind of cause is defined as the "Establishment cause for VoLTE", and also applied to a case in which separate causes are defined for respective service types (voice, video, SMS). In the case where separate causes are defined for respective service types, the NAS layer processing unit 113 or the RRC layer processing unit 123 selects an "Establishment cause for VoLTE" corresponding to the service types of a call to be made in processing steps (No. 1) to processing steps (No. 3). Further, the RRC layer processing unit 123 sets an "Establishment cause for VoLTE" corresponding to the selected service type in the RRC connection request and transmits the set result to the base station eNB. Further, an embodiment may be applied to a case in which only a single cause is defined as the "Establishment cause for VoLTE" and only a single cause is defined as the "High Priority Access Establishment cause for VoLTE", and also applied to a case in which separate causes are defined as the "Establishment cause for VoLTE" for respective service types (voice, video, SMS) and separate causes are defined as the "High Priority Access Establishment cause for VoLTE" for respective service types (voice, video, SMS). In the case where separate causes are defined for respective service types, the NAS layer processing unit 113 or the RRC layer processing unit 123 selects an "Establishment cause for VoLTE" corresponding to the service types of a call to be made, or a "High Priority Access Establishment cause for VoLTE" corresponding to the service types of a call to be made, in processing steps (No. 1) to processing steps (No. 3). Further, the RRC layer processing unit 123 sets an "Establishment cause for VoLTE" or a "High Priority Access Establishment cause for VoLTE" corresponding to the selected service type in the RRC connection request, and transmits the set result to the base station eNB.

The above-described apparatuses (user apparatus UE/base station eNB) according to an embodiment may include a CPU and a memory, may be realized by having a program executed by the CPU (processor), may be realized by hardware such as hardware circuitry in which the logic described in an embodiment is included, or may be realized by a mixture of a program and hardware.

As described above, embodiments have been described. The disclosed invention is not limited to these embodiments, and a person skilled in the art would understand various variations, modifications, replacements, or the like. Specific examples of numerical values have been used for encouraging understanding of the present invention. These numeric values are merely examples and, unless otherwise noted, any appropriate values may be used. In the above description, partitioning of items is not essential to the present invention. Matters described in more than two items may be combined if necessary. Matters described in one item may be applied to matters described in another item (as long as they do not conflict). In a functional block diagram, boundaries of functional units or processing units do not necessarily correspond to physical boundaries of parts. Operations of multiple functional units may be physically performed in a single part, or operations of a single functional unit may be physically performed by multiple parts. The order of steps in the above described sequences and flowcharts according to an embodiment may be changed as long as there is no contradiction. For the sake of description convenience, the user apparatus UE/the base station eNB have been described by using functional block diagrams. These apparatuses may be implemented by hardware, by software, or by combination of both. The software which is executed by a processor included in a user apparatus UE according to an embodiment and the software which is executed by a processor included in a base station eNB may be stored in a random access memory (RAM), a flash memory, a read-only memory (ROM), an EPROM, an EEPROM, a register, a hard disk drive (HDD), a removable disk, a CD-ROM, a database, a server, or any other appropriate recording medium. It should be noted that the "Establishment cause for VoLTE" or the "High Priority Access Establishment cause for VoLTE" is an example of the "information indicating a request requesting an RRC connection to be established for making a VoLTE call". Further, the "conventional Establishment cause" is an example of the "information indicating a request requesting an RRC connection to be established according to a predetermined cause". The "High Priority Access Establishment cause for VoLTE" is an example of the "information indicating a request requesting an RRC connection to be established for a high priority user apparatus to make a VoLTE call".

The present application is based on and claims the benefit of priority of Japanese Priority Application No. 2015-218980 filed on Nov. 6, 2015, and Japanese Priority Application No. 2015-227829 filed on Nov. 20, 2015, the entire contents of which are hereby incorporated by reference.

DESCRIPTION OF THE REFERENCE NUMERALS

UE User apparatus
eNB Base station
101 Signal transmission unit
102 Signal reception unit
103 Determination unit
113 NAS layer processing unit
123 RRC layer processing unit
201 Signal transmission unit
202 Signal reception unit
203 RRC layer processing unit
301 RE module
302 BB processing module
303 Apparatus control module
304 SIM slot
401 RE module
402 BB processing module
403 Apparatus control module
404 Communication IF

What is claimed is:

1. A user apparatus that communicates with a base station, the user apparatus comprising:
a processer that, in the case of making a Voice over Long Term Evolution (VoLTE) call, determines whether a predetermined indicator is included in broadcast information received from the base station; and
a transmitter that, in the case where it is determined that the predetermined indicator is included in the broadcast information, transmits to the base station a Radio Resource Control (RRC) connection request message that includes information indicating a request for an RRC connection to be established for making the VoLTE call,
wherein
the processor controls a Non-Access Stratum (NAS) layer and an RRC layer,
the processor controls, in the case of making the VoLTE call, the NAS layer to report to the RRC layer information indicating the request for the RRC connection to be established according to a predetermined cause, the information indicating the request for the RRC connection to be established according to the predetermined cause being to be replaced, with the information indicating the request for the RRC connection to be established for making the VoLTE call, by the RRC layer,
the processor controls the RRC layer, in the case where the predetermined indicator is included in the broadcast information, to report to the transmitter the RRC connection request message by replacing, with the information indicating the request for the RRC connection to be established for making the VoLTE call, the information transmitted from the NAS layer indicating the request for the RRC connection to be established according to the predetermined cause, and
the transmitter transmits to the base station the RRC connection request message reported from the RRC layer of the processor, wherein the RRC connection request message includes the information indicating the request for the RRC connection to be established for making the VoLTE call.

2. The user apparatus according to claim 1, wherein the predetermined indicator indicates that the base station has a capability of making the VoLTE call.

3. The user apparatus according to claim 1, wherein the information indicating the request for the RRC connection to be established for making the VoLTE call is information indicating the request for the RRC connection to be established for a high priority user apparatus to make a VoLTE call.

4. An indication method performed by a user apparatus that communicates with a base station, the indication method comprising:
determining whether a predetermined indicator is included in broadcast information received from the base station in the case of making a Voice over Long Term Evolution (VoLTE) call; and,
in the case where it is determined that the predetermined indicator is included in the broadcast information, transmitting to the base station a Radio Resource Control (RRC) connection request message in which information indicating a request for an RRC connection to be established for making the VoLTE call is set, wherein the user apparatus controls a Non-Access Stratum (NAS) layer and an RRC layer, the user apparatus controls, in the case of making the VoLTE call, the NAS layer to report to the RRC layer information indicating the request for the RRC connection to be established according to a predetermined cause, the information indicating the request for the RRC connection to be established according to the predetermined cause being to be replaced, with the information indicating the request for the RRC connection to be established for making the VoLTE call, by the RRC layer, the user apparatus controls the RRC layer, in the case where the predetermined indicator is included in the broadcast information, to report to the transmitter the RRC connection request message by replacing, with the information indicating the request for the RRC connection to be established for making the VoLTE call, the information transmitted from the NAS layer indicating the request for the RRC connection to be established according to the predetermined cause, and the user apparatus transmits to the base station the RRC connection request message reported from the RRC layer of the processor, wherein the RRC connection request message includes the information indicating the request for the RRC connection to be established for making the VoLTE call.

* * * * *